Sept. 19, 1950 S. A. HALL 2,522,756

DRIVE UNIT

Filed March 12, 1946 2 Sheets-Sheet 1

INVENTOR.
Stanley A. Hall

By.
Hoodling and Krost
attys

Sept. 19, 1950 S. A. HALL 2,522,756

DRIVE UNIT

Filed March 12, 1946 2 Sheets-Sheet 2

INVENTOR.
Stanley A Hall
BY
Spaulding and Krost
attys

Patented Sept. 19, 1950 2,522,756

UNITED STATES PATENT OFFICE 2,522,756

DRIVE UNIT

Stanley A. Hall, Vancouver, British Columbia, Canada

Application March 12, 1946, Serial No. 653,733

8 Claims. (Cl. 74—209)

My invention relates in general to record players, and in particular to improvements in those record players in which the record is rotated by a rotation drive means which frictionally engages the circumferential edge thereof.

An object of my invention is the provision of a record player in which the record is rotated by drive means frictionally engaging the circumferential edge of the record.

Another object of my invention is the provision of a record player which will rotate the record while disposed in any position.

A further object of my invention is the provision of a resilient ring-shaped means to frictionally engage the circumferential edge of a record to rotate the record, and drive means to frictionally engage and rotate this ring-shaped means.

Still a further object of my invention is the provision of a record player having spindle means to freely rotatably support a record and having rotation drive means to frictionally engage the circumferential edge of the record to rotate it.

A still further object of my invention is the provision of a resilient element to engage and drive a driven element, drive means to drive said resilient element and means to hold the resilient element in engagement with the drive means.

A further object of my invention is the provision of a resilient element to drive a driven element in which the resilient element tends to retain its normal shape and thereby engages the driven element.

Other objects and a fuller understanding of my invention may be had by referring to the following description and claims, taken in conjunction with the accompanying drawing, in which:

Figure 1 of my drawings is a front-elevational view of a record player embodying the features of my invention;

Figure 2 of my drawings is a back-elevational view of my record player;

Figure 1:
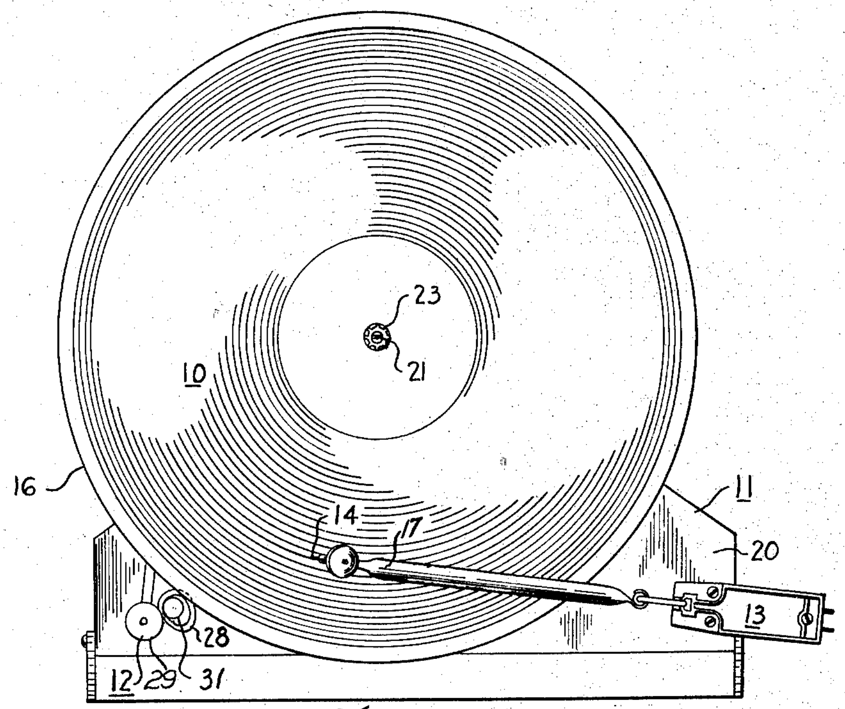

A record 10 as is shown in the drawings of the preferred embodiment of my invention, is supported by record support means 11. A record rotation drive means 12 engages the circumferential edge 16 of the record to rotate the record 10. A sound reproduction unit 13 has a stylus 14 carried by a support arm 17 to engage the undulated grooves 15 of the record 10.

The record 10, as generally referred to throughout my description, is of the standard phonograph disc type having a small opening in the center thereof. Although I refer throughout my description to a record player and the rotation of a record, it is understood that my invention may be used for other mechanisms in which the tendency of the driving means to resile or retain its original shape is used to drive the driven means.

My record support means 11, which freely rotatably supports the record 10 comprises in general a support plate 20 and a shaft 21, on which the record rotates. The shaft 21 is connected by bearing support means 22 to the support plate 20. In operation, the shaft 21 has a spring clip 23 and a washer 24 on the end thereof which engages the record in and about the center opening of the record. It is understood however, that other suitable means may be used to support the record whereby it may be freely rotated with respect to the record support means 11.

The sound reproduction unit 13, illustrated in my drawing, is more fully described in my copending application entitled "Phonograph Reproducing Device" and having Serial No. 653,732. Other suitable phonograph pick-up devices or sound reproduction units may be used for this purpose.

Figure 2:
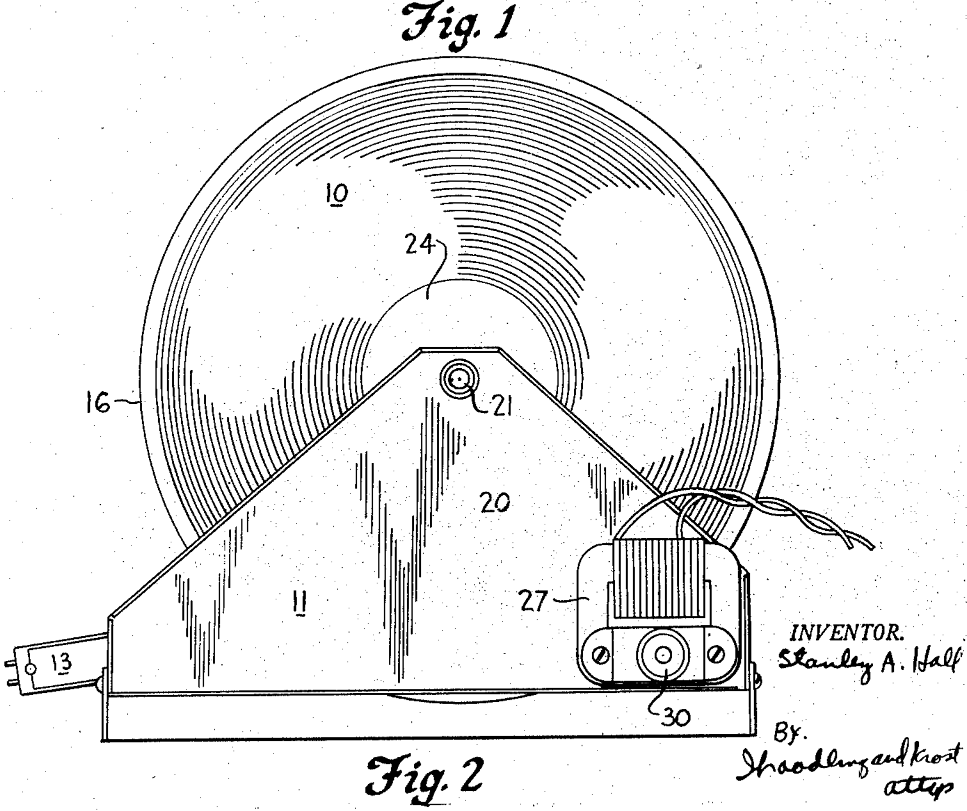
Figures 3, 4, 5, 6:
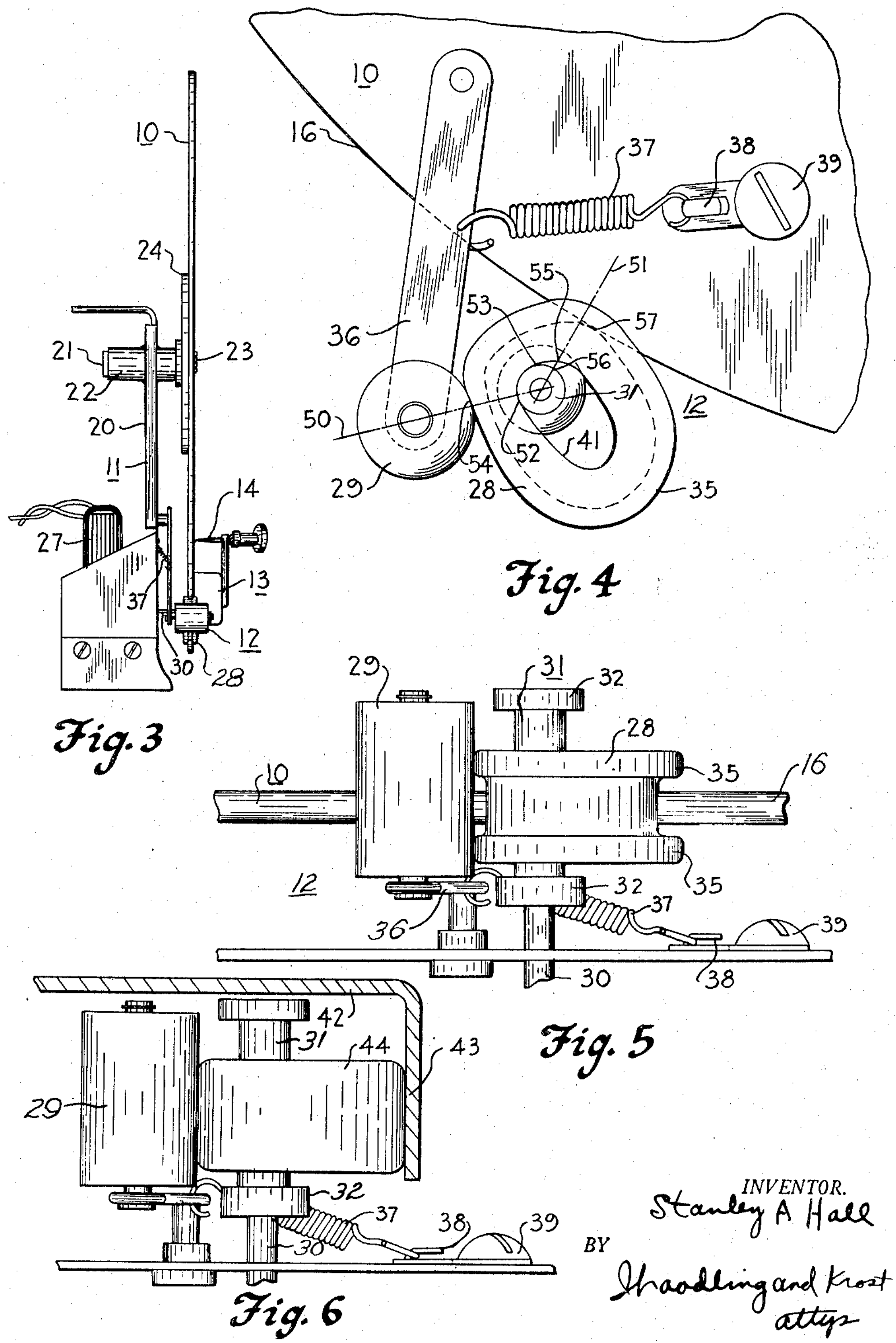
Figure 3 is an end view of my record player.
Figure 4 is a fragmentary enlarged diagrammatic view, with parts being omitted for clarity, illustrating the record rotation drive means.
Figure 5 is an edge-wise view of the record rotation drive means.
Figure 6 is a fragmentary enlargement illustrating a modification of my invention in that the rotation drive means is used with rim-drive turntable.

My record rotation drive means 12 is constructed from a suitable electric motor 27, a rotatable resilient element or ring 28 and a rider wheel 29. The electric motor 27, may be of any suitable construction having an extended shaft 30, and may be fastened by suitable means to the record support means 11. Figures 2 and 3 best illustrate that the motor is fastened to the back side of the record support means 11 with the motor shaft 30 extending therethrough and disposed near the circumferential edge 16 of the record 10. This motor shaft 30 has a spool shaped portion 31 about which the resilient ring 28 rotates. Flanges 32 on the ends of the spool shaped portion 31 prevent the resilient ring 28 traveling in an excessive endwise direction thereof.

The resilient ring 28 normally has a circular shape. This resilient ring may be constructed of rubber or other material having a resiliency which will tend to hold its shape circular. Ring flanges 35 disposed on either side of the resilient ring 28 extend beyond the circumferential edge 16 of the record and toward the center thereof to hold the resilient ring 28 in frictional engagement with the circumferential edge 16 of the record 10. In the preferred embodiment, as is best illustrated in Figure 5 of my drawing, the distance between these flanges 35 is greater than the thickness of the record 10. The inside diameter of the resilient ring 28 is greater than the diameter of the spool portion 31 about which it travels.

The rider wheel 29 which is disposed on the side of the resilient ring 28 substantially opposite the record 10 is freely rotatably supported by an arm 36. This arm 36 may be swingably fastened by suitable means to the record support means 11. A spring 37, fastened intermediate the ends of the arm and the record support means 11 urges the rider wheel 29 towards the circumferential edge 16 of the record. One end of the spring 37 may be hooked into an opening in the support arm 36 and the other end of the spring 37 may be hooked into an opening in a spring attachment hook 38. This hook 38 may be fastened by a screw 39, or by other suitable means to the record support means 11. It is understood however, that other suitable means may be used to urge the rider wheel 29 towards the circumferential edge 16 of the record 10.

In my drawing, Figure 4, the dash-dot line 50 represents a center line between the rider wheel 29 and the spool portion 31 of the motor drive shaft 30. The dash-dot line 51 represents the center line between the spool portion 31 and the record 10. The rider wheel 29 contacts the resilient ring 28 at a point 54 located substantially on the center line 50. It is to be understood that the dash-dot center lines and the number points are referred to as an approximate location and not exact location. The resilient ring 28 engages an arcuate surface of the spool portion 31 between engagement points, numbered 52 and 53, the point 52 being substantially on the center line 50 and the point 53 being on the forward side of the center line 50 towards the record. The record engages the resilient ring 28 substantially on a point 57 of the dash-dot line 51. The number 55 represents a point on the inside surface 41 of the resilient ring 28 and on the dash-dot line 51. The number 56 represents a point on the spool portion 31 on a dash-dot line 51.

The resilient ring 28 when rotating to drive the record 10 is deformed to a non-circular shape, somewhat as illustrated in Figure 4 of my drawing. When urged toward the spool 31 and along the dash-dot line 50 by the rider wheel 29, the resilient ring 28 will tend to retain or resile to its normal circular shape and thus form a circular shaped ring, with its center substantially on the dash-dot center line 50. The resiliency of the ring urges it toward the record 10, thus establishing a space between the points 55 and 56 of the dash-dot line 51. The rider wheel 29 urges the resilient ring into frictional engagement with the arcuate surface of the spool portion 31 between the points 52 and 53. This frictional engagement between the inside surface 41 of the resilient ring 28 and the spool portion 31 of the motor drive shaft 30 causes the spool portion 31 to rotate the resilient ring 28. The resiliency of the ring tends to make it resile to its normal circular shape, and thus engage the circumferential edge 16 of the record 10 at the point 57. The resilient ring 28, which is rotated by the spool portion 31, frictionally engages the circumferential edge 16 of the record 10 and rotates the record.

As a rule, disc shaped records are not absolutely flat and tend to wabble sideways at the circumferential edge. To overcome this, I have mounted the resilient ring 28 to permit it to travel back and forth along the spool portion 31 of the shaft 30 to keep it in frictional engagement with the record circumferential edge 16. An advantage of my invention is that the rotation drive means may be used to rotate a record while that record is disposed in any position. In my drawings, I have illustrated the record as being rotated while in a vertical position.

In Figure 6, I illustrate a modified version of my rotation drive means which may be used on the rim 43 of a record player turntable 42. In this modification, a substantially doughnut shaped resilient ring 44 may be used to frictionally engage and rotate the inside surface of the rim 43 of the turntable. The doughnut shaped resilient ring 44 is held in frictional engagement with the motor shaft and with the rim of the turntable by a rider wheel. In general, the operation of my modified rotation drive means is similar to that of the preferred embodiment.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A record player comprising, support means for rotatably supporting a record, said record having a circumferential edge, a freely rotatable wheel supported by said support means, spring means for urging said freely rotatable wheel toward said circumferential edge, a drive wheel disposed between said freely rotatable wheel and said circumferential edge, and a resilient ring about said drive wheel, said freely rotatable wheel compressing said ring between it and said circumferential edge of the record, said drive wheel frictionally engaging said ring to rotate it, said ring thereby rotating said record when it is compressed by the freely rotatable wheel and rotated by the drive wheel.

2. A record player comprising, support means for rotatably supporting a record, a resilient ring to engage the circumferential edge of said record to rotate the record, a drive wheel within said ring to frictionally engage and rotate said ring, a rider wheel, and spring means to urge said rider wheel toward said drive wheel and said record, said rider wheel urging said resilient ring against said drive wheel and the edge of said record.

3. A record player comprising, support means for rotatably supporting a record, a resilient ring having spaced flanges thereon with a record engagement portion therebetween for engaging the circumferential edge of said record, said resilient ring thereby rotating said record when the resilient ring is in engagement with said record and is rotated, a drive wheel disposed within said resilient ring for frictionally engaging and rotating said resilient ring, a rider wheel supported by said support means and freely rotatable therewith, and spring means for urging said rider wheel toward said drive wheel and toward said record, said rider wheel urging said resilient ring against said drive wheel and against said record, whereby said resilient ring is rotated to rotate said record.

4. A phonograph record drive comprising, a base, rotatable support means carried by said base for supporting phonograph record means, one of said means having a circumferential edge, a drive wheel having an axis substantially parallel to the axis of the phonograph record means, a resiliently deformable ring having inner and outer annular surfaces disposed about said drive wheel, an idler wheel having an axis substantially parallel to the axis of said drive wheel, means for supporting said idler wheel in movable relationship with said base, said idler wheel adapted to engage the outer annular surface of said ring, and spring means for urging said idler wheel toward said drive wheel to thus effect frictional engagement between said idler wheel, said drive wheel, said ring and said circumferential edge, said resilient ring being deformed from its normal circular shape by the urging of said spring means.

5. A phonograph record drive comprising, a base, rotatable support means carried by said base for supporting phonograph record means, one of said means having a circumferential edge, a drive wheel disposed near said circumferential edge with the axis thereof substantially parallel to the axis of the phonograph record means, a first reference line passing through the said two axes, a resiliently deformable ring having inner and outer annular surfaces disposed about said drive wheel, an idler wheel having an axis substantially parallel to the axis of said drive wheel with a second reference line passing through each of said two last-mentioned axes, movable means for supporting said idler wheel in movable relationship with said base and positioned more remotely from said circumferential edge than said drive wheel, said idler wheel adapted to engage the outer annular surface of said ring, and spring means for urging said movable means and hence said idler wheel toward said drive wheel to thus effect frictional engagement between said idler wheel and the outer annular surface of said ring, between said drive wheel and the inner annular surface of said ring, and between said outer annular surface of said ring and said circumferential edge, said resilient ring being deformed from its normal circular shape by the urging of said spring means, and said first and second reference lines defining an angle less than 180 degrees.

6. A phonograph record drive comprising, a base, rotatable support means carried by said base for supporting phonograph record means, one of said means having a circumferential edge, a drive wheel disposed near said circumferential edge with the axis thereof substantially parallel to the axis of the phonograph record means, a first reference line passing through the said two axes, a resiliently deformable ring of rubber-like material having inner and outer annular surfaces disposed about said drive wheel, an idler wheel having an axis substantially parallel to the axis of said drive wheel with a second reference line passing through each of said two last-mentioned axes, pivotal means for supporting said idler wheel in pivotal relationship with said base and positioned more remotely from said circumferential edge than said drive wheel, said idler wheel having an axial length greater than the axial length of said ring to thus be adapted to engage the outer annular surface of said ring, and spring means for urging said pivotal means and hence said idler wheel toward said drive wheel to thus effect frictional engagement between said idler wheel and the outer annular surface of said ring, between said drive wheel and the inner annular surface of said ring, and between said outer annular surface of said ring and said circumferential edge, said resilient ring being deformed from its normal circular shape by the urging of said spring means, and said first and second reference lines defining an angle less than 180 degrees.

7. A phonograph record drive comprising, support means for rotatably supporting a phonograph record having a circumferential edge, a drive wheel disposed near said circumferential edge with the axis thereof substantially parallel to the axis of the phonograph record, a first reference line passing through the said two axes, a resiliently deformable ring having inner and outer annular surfaces disposed about said drive wheel, an idler wheel having an axis substantially parallel to the axis of said drive wheel with a second reference line passing through each of said two last-mentioned axes, movable means for supporting said idler wheel in movable relationship with said record support means and positioned more remotely from said record circumferential edge than said drive wheel, said idler wheel having an axial length greater than the axial length of said ring to thus be adapted to engage the outer annular surface of said ring, and spring means for urging said movable means and hence said idler wheel toward said drive wheel to thus effect frictional engagement between said idler wheel and the outer annular surface of said ring, between said drive wheel and the inner annular surface of said ring, and between said outer annular surface of said ring and said circumferential record edge, said resilient ring being deformed from its normal circular shape by the urging of said spring means, and said first and second reference lines defining an angle less than 180 degrees.

8. A phonograph record drive comprising, support means for rotatably supporting a phonograph record having a given thickness and a circumferential edge, a drive wheel disposed near said circumferential edge with the axis thereof substantially parallel to the axis of the phonograph record, a first reference line passing through the said two axes, a resiliently deformable ring of rubber-like material having inner and outer annular surfaces disposed about said drive wheel, spaced parallel flanges on said ring having an axial distance therebetween greater than the thickness of said record, an idler wheel having an axis substantially parallel to the axis of said drive wheel with a second reference line passing through each of said two last-mentioned axes, pivotal means for supporting said idler wheel in pivotal relationship with said record support means and positioned more remotely from said record circumferential edge than said drive wheel, said idler wheel having an axial length greater than the axial length of said ring to thus be adapted to engage the peripheral surface of said spaced flanges thereon, and spring means for urging said pivotal means and hence said idler wheel toward said drive wheel to thus effect frictional engagement between said idler wheel and the peripheral surface of said spaced flanges, between said drive wheel and the inner annular surface of said ring, and between said outer annular surface of said ring and said circumferential record edge, said resilient ring being deformed from its normal circular shape by the urging of said spring means, and said first and second reference lines defining an angle less than 180 degrees.

STANLEY A. HALL.

REFERENCES CITED

The following references are of record in the file of this patent:

UNITED STATES PATENTS

| Number | Name | Date |
|---|---|---|
| 957,277 | Underwood | May 10, 1910 |
| 1,343,640 | Myers | June 15, 1920 |
| 2,161,148 | Erwood | June 6, 1939 |

FOREIGN PATENTS

| Number | Country | Date |
|---|---|---|
| 183,844 | Great Britain | July 28, 1922 |